US012387613B2

(12) United States Patent
Verma et al.

(10) Patent No.: US 12,387,613 B2
(45) Date of Patent: Aug. 12, 2025

(54) UNMANNED MACHINE SYNCHRONIZATION USING ROBOTIC SENSING

(71) Applicant: International Business Machines Corporation, Armonk, NY (US)

(72) Inventors: Dinesh C. Verma, New Castle, NY (US); Utpal Mangla, Toronto (CA); Mathews Thomas, Flower Mound, TX (US); Gerald Coon, Durham, NC (US); Mudhakar Srivatsa, White Plains, NY (US); Satishkumar Sadagopan, Leawood, KS (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 18/327,421

(22) Filed: Jun. 1, 2023

(65) Prior Publication Data

US 2024/0404415 A1 Dec. 5, 2024

(51) Int. Cl.

| | |
|---|---|
| ***G08G 5/56*** | (2025.01) |
| ***G08G 5/21*** | (2025.01) |
| ***G08G 5/55*** | (2025.01) |
| ***G08G 5/57*** | (2025.01) |

(52) U.S. Cl.

CPC ................. *G08G 5/56* (2025.01); *G08G 5/21* (2025.01); *G08G 5/55* (2025.01); *G08G 5/57* (2025.01)

(58) Field of Classification Search

None

See application file for complete search history.

(56) References Cited

U.S. PATENT DOCUMENTS

| | | | | |
|---|---|---|---|---|
| 8,649,565 | B1 | 2/2014 | Kim | |
| 10,838,683 | B2 | 11/2020 | Van Der Mee | |
| 10,937,324 | B2 | 3/2021 | Vaughn | |
| 11,137,746 | B2 | 10/2021 | Von Tschirschnitz | |
| 11,373,538 | B1 * | 6/2022 | Nielsen | G08G 5/55 |
| 11,431,405 | B2 | 8/2022 | Prinz | |
| 11,540,162 | B2 | 12/2022 | Hu | |
| 11,546,361 | B2 | 1/2023 | Babu | |
| 2007/0288132 | A1 | 12/2007 | Lam | |
| 2017/0069214 | A1 * | 3/2017 | Dupray | G08G 5/56 |
| 2018/0074523 | A1 * | 3/2018 | Cantrell | B64D 1/22 |
| 2021/0241634 | A1 * | 8/2021 | Sarim | G08G 5/56 |
| 2021/0255645 | A1 | 8/2021 | Rong | |

(Continued)

OTHER PUBLICATIONS

Alsolami et al., "Development Of Self-Synchronized Drones' Network Using Cluster-Based Swarm Intelligent Approach", IEEE Access, Mar. 9, 2021, vol. 9, Digital Object Identifier 10.1109/ACCESS.2021.3064905, 13 pages.

(Continued)

*Primary Examiner* — Peter D Nolan
*Assistant Examiner* — Jacob Kent Besteman-Street
(74) *Attorney, Agent, or Firm* — Monchai Chuaychoo

(57) ABSTRACT

The present inventive concept provides for a method of unmanned machine synchronization using robotic sensing. The method includes generating at least one physical signal in the vicinity of at least one unmanned machine. The at least one generated physical signal is received by the at least one unmanned machine. At least one task is performed by the at least one unmanned machine based on the at least one received generated physical signal.

20 Claims, 3 Drawing Sheets

(56) References Cited

U.S. PATENT DOCUMENTS

| | | | | |
|---|---|---|---|---|
| 2021/0396905 | A1 | 12/2021 | Neill | |
| 2022/0177129 | A1* | 6/2022 | Formoso | F42B 12/40 |
| 2022/0308575 | A1* | 9/2022 | Snaider | G05D 1/0016 |
| 2022/0386138 | A1 | 12/2022 | Jurt | |
| 2022/0399936 | A1 | 12/2022 | Arksey | |
| 2023/0058405 | A1 | 2/2023 | Chen | |
| 2024/0272650 | A1* | 8/2024 | Wang | G05D 1/243 |

OTHER PUBLICATIONS

Davoli et al., "Hybrid LoRa-IEEE 802.11s Opportunistic Mesh Networking For Flexible UAV Swarming", MDPI, Drones 2021, 5, 26, https://doi.org/10.3390/drones5020026, Published Apr. 15, 2021, 32 pages.

Fabra et al., "MUSCOP: Mission-Based UAV Swarm Coordination Protocol", IEEE Access, vol. 8, 2020, Apr. 30, 2020, Digital Object Identifier 10.1109/ACCESS.2020.2987983, 14 pages.

Geiger, Christopher, "Cyber Diode: Animated 2D Barcodes as a Mobile and Robust Data Diode,", 2018 9th EEE Annual Ubiquitous Computing, Electronics & Mobile Communication Conference (UEMCON). IEEE, 2018, 4 pages.

Kuru, Kaya, "Planning The Future Of Smart Cities With Swarms Of Fully Autonomous Unmanned Aerial Vehicles using A Novel Framework", IEEE Access, vol. 9, Published Jan. 5, 2021, Digital Object Identifier 10.1109/ACCESS.2020.3049094, 25 pages.

Sivakumar et al., "UAV Swarm Coordination Using Cooperative Control For Establishing A Wireless Communications Backbone", Proc. of 9th Int. Conf. on Autonomous Agents and Multiagent Systems (AAMAS 2010), May 10-14, 2010, Toronto, Canada, pp. 1157-1164.

* cited by examiner

UNMANNED MACHINE SYNCHRONIZATION USING ROBOTIC SENSING

BACKGROUND

Exemplary embodiments of the present inventive concept relate to unmanned machine synchronization, and more particularly, to unmanned machine synchronization using robotic sensing.

Unmanned machines (e.g., UAVs) receive instructions to perform a multitude of different tasks via wireless transmissions. Some of these tasks require a coordinated effort by a plurality of unmanned machines each performing specific roles. For example, a plurality of unmanned machines can collectively survey a large area with each unmanned machine receiving a wireless transmission to survey a designated portion of the overall area. Such multicast coordination can be implemented by a "coordinator". However, multicast coordination requires consistent network connectivity of the coordinator and each of the unmanned machines to be successful. In addition, unmanned machines with different specific roles require unique generation and dissemination of a corresponding wireless transmission. Furthermore, wireless transmissions render unmanned machines susceptible to jamming, interception, interference, and hacking.

SUMMARY

Exemplary embodiments of the present inventive concept relate to a method, a computer program product, and a system for unmanned machine synchronization using robotic sensing.

According to an exemplary embodiment of the present inventive concept, a method of unmanned machine synchronization using robotic sensing is provided. The method includes generating at least one physical signal in the vicinity of at least one unmanned machine. The at least one generated physical signal is received by the at least one unmanned machine. At least one task is performed by the at least one unmanned machine based on the at least one received generated physical signal. Thus, by the provided method, unmanned machine synchronization can be accomplished using robotic sensing of physical signals without necessary reliance on wireless transmissions.

According to an exemplary embodiment of the present inventive concept, a computer program product for unmanned machine synchronization using robotic sensing is provided. The computer program product includes one or more computer-readable storage media and program instructions stored on the one or more non-transitory computer-readable storage media capable of performing a method. The method includes generating at least one physical signal in the vicinity of at least one unmanned machine. The at least one generated physical signal is received by the at least one unmanned machine. At least one task is performed by the at least one unmanned machine based on the at least one received generated physical signal. Thus, by the provided computer program product, unmanned machine synchronization can be accomplished using robotic sensing of physical signals without necessary reliance on wireless transmissions.

According to an exemplary embodiment of the present inventive concept, a computer system is provided for unmanned machine synchronization using robotic sensing. The computer system includes one or more computer processors, one or more computer-readable storage media, and program instructions stored on the one or more of the computer-readable storage media for execution by at least one of the one or more processors capable of performing a method. The method includes generating at least one physical signal in the vicinity of at least one unmanned machine. The at least one generated physical signal is received by the at least one unmanned machine. At least one task is performed by the at least one unmanned machine based on the at least one received generated physical signal. Thus, by the provided computer system, unmanned machine synchronization can be accomplished using robotic sensing of physical signals without necessary reliance on wireless transmissions.

According to an exemplary embodiment of the present inventive concept, the at least one generated signal is an audio or visual signal. Thus, unmanned machine synchronization can be accomplished without using wireless transmissions.

According to an exemplary embodiment of the present inventive concept, the performed at least one task is based on a position of the at least one unmanned machine relative to the at least one received generated physical signal. Thus, physical signal attributes, as received by the unmanned machine, can correspond to different predetermined synchronization instructions.

According to an exemplary embodiment of the present inventive concept, the at least one performed task includes synchronizing the plurality of unmanned machines. Thus, complex tasks involving specific roles of unmanned machines can be accomplished without necessary reliance on wireless transmissions.

BRIEF DESCRIPTION OF THE DRAWINGS

The following detailed description, given by way of example and not intended to limit the exemplary embodiments solely thereto, will best be appreciated in conjunction with the accompanying drawings, in which.

Figure 1:
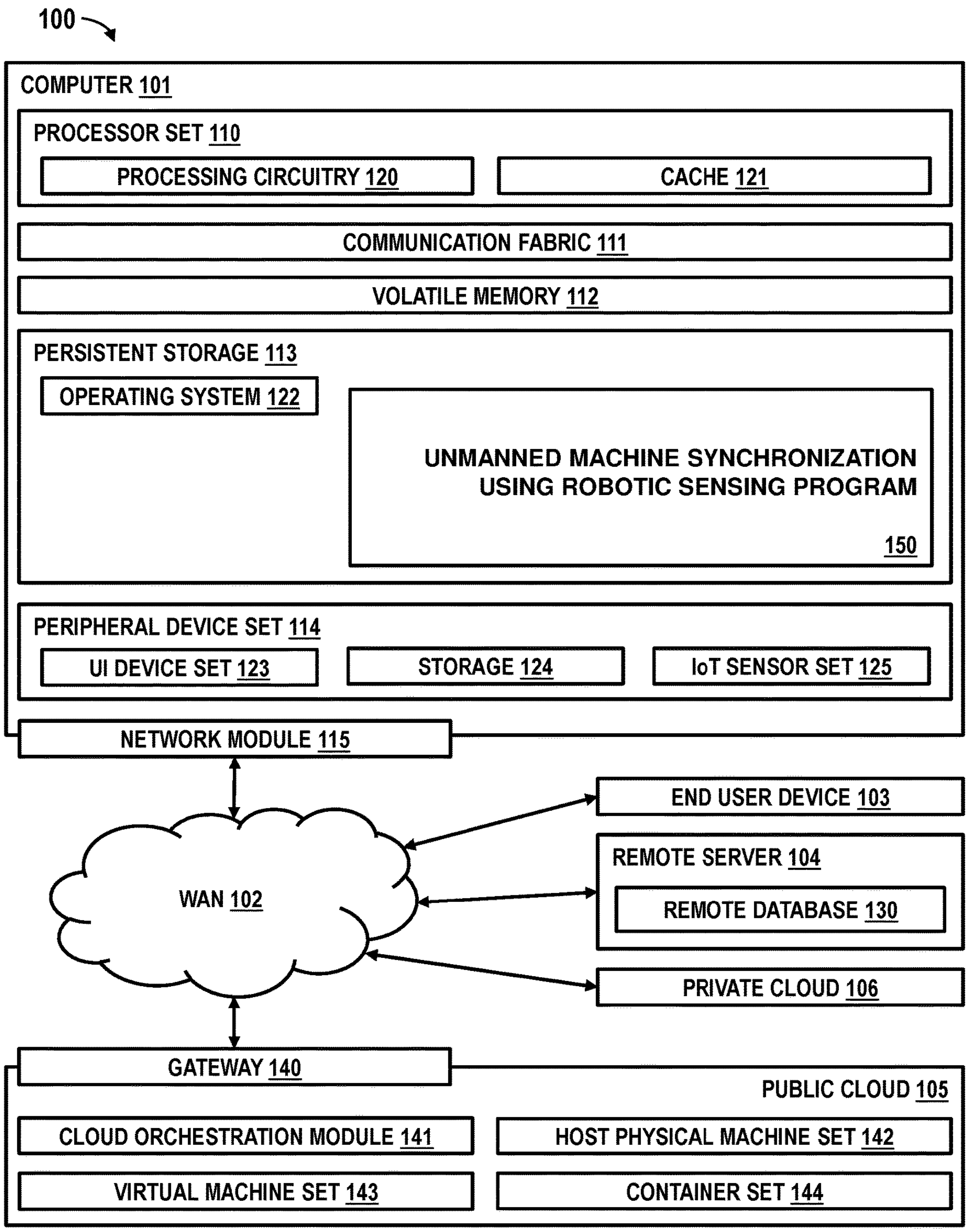
FIG. 1 illustrates a schematic diagram of computing environment 100 including an unmanned machine synchronization using robotic sensing program 150, in accordance with an exemplary embodiment of the present inventive concept.

It is to be understood that the included drawings are not necessarily drawn to scale/proportion. The included drawings are merely schematic examples to assist in understanding of the present inventive concept and are not intended to portray fixed parameters. In the drawings, like numbering may represent like elements.

DETAILED DESCRIPTION

Exemplary embodiments of the present inventive concept are disclosed hereafter. However, it shall be understood that the scope of the present inventive concept is dictated by the claims. The disclosed exemplary embodiments are merely illustrative of the claimed system, method, and computer program product. The present inventive concept may be embodied in many different forms and should not be construed as limited to only the exemplary embodiments set forth herein. Rather, these included exemplary embodiments are provided for completeness of disclosure and to facilitate an understanding to those skilled in the art. In the detailed description, discussion of well-known features and techniques may be omitted to avoid unnecessarily obscuring the presented exemplary embodiments.

References in the specification to "one embodiment," "an embodiment," "an exemplary embodiment," etc., indicate that the embodiment described may include a particular feature, structure, or characteristic, but not every embodiment may necessarily include that feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether explicitly described.

In the interest of not obscuring the presentation of the exemplary embodiments of the present inventive concept, in the following detailed description, some processing steps or operations that are known in the art may have been combined for presentation and for illustration purposes, and in some instances, may have not been described in detail. Additionally, some processing steps or operations that are known in the art may not be described at all. The following detailed description is focused on the distinctive features or elements of the present inventive concept according to various exemplary embodiments.

As described above, implementing action by unmanned machines presently requires receipt of wireless transmissions. These wireless transmissions rely upon consistent network connectivity and are vulnerable to jamming, interception, interference, and hacking. Moreover, in the case of an unmanned machine task that involves the coordinated synchronization of a plurality of unmanned machines, multiple different role-specific wireless transmission signals are required, which is inefficient and creates delay. The present inventive concept provides for unmanned machine synchronization using robotic sensing via generated physical signals.

FIG. 1 illustrates a schematic diagram of computing environment 100 including the unmanned machine synchronization using robotic sensing program 150, in accordance with an exemplary embodiment of the present inventive concept.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as the unmanned machine synchronization using robotic sensing program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located “off chip.” In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as “the inventive methods”). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as “images.” A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
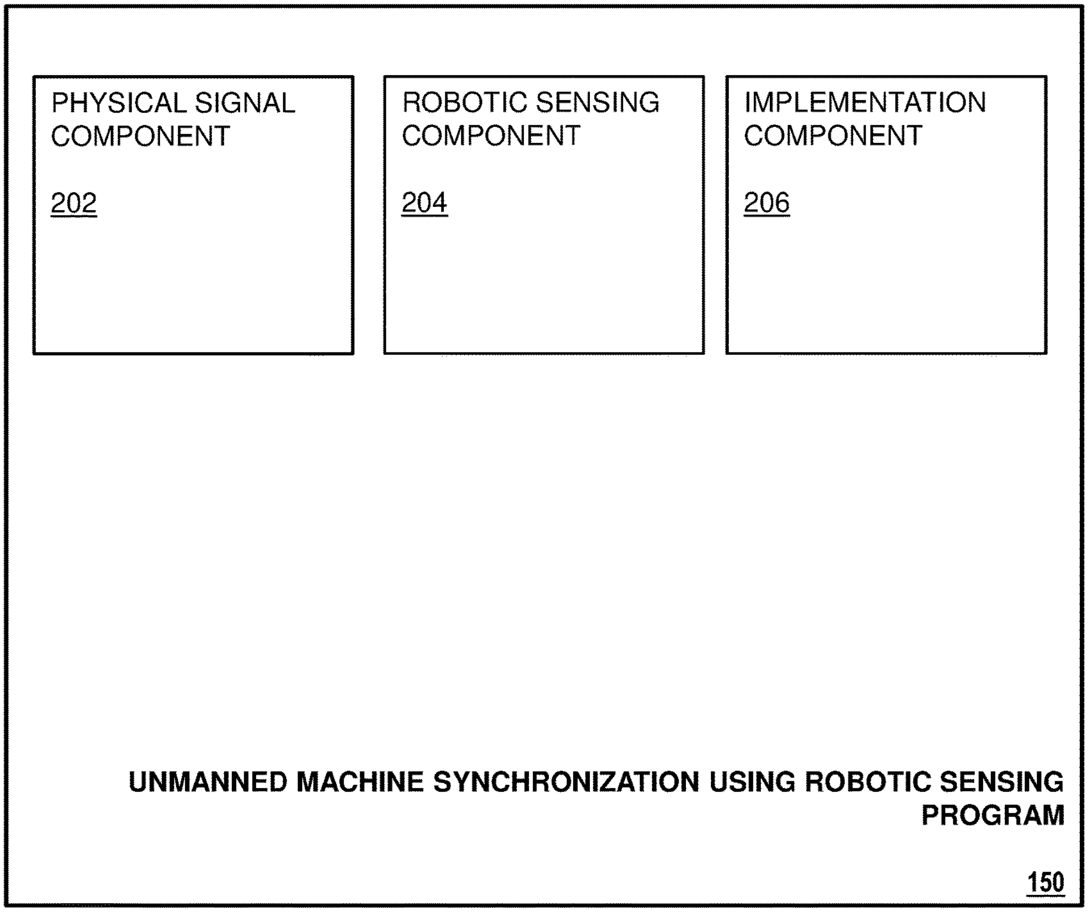
FIG. 2 illustrates a block diagram of components included in the unmanned machine synchronization using robotic sensing program 150, in accordance with an exemplary embodiment of the present inventive concept.

FIG. 2 illustrates a block diagram of components included in the unmanned machine synchronization using robotic sensing program 150, in accordance with an exemplary embodiment of the present inventive concept.

The physical signal component 202 can generate at least one physical signal corresponding to implementation instructions for at least one unmanned machine (e.g., a UAV) in the vicinity (e.g., within a robotic sensing/physical signal measuring distance and/or a predetermined range) to perform a task singly or in coordination (e.g., synchronization). The physical signal component 202 can be included in at least one unmanned machine (e.g., a coordinator unmanned machine and/or an unmanned machine also involved in performing the at least one task) and/or can be connected thereto via a network. The physical signal component 202 can include a display device (e.g., a wraparound screen) and/or speakers. The physical signal component 202 can generate the at least one physical signal based on detected environmental conditions (e.g., interruption of wireless transmissions, network connectivity loss/impairment, smoke, heat, temperature, audio cues, visual cues, proximity/tasks/network status of unmanned machines at a predetermined location, presence of detected physical obstacles to robotic sensing/physical signal measurement, etc.), predetermined times, and/or user input. In an embodiment, a coordinator unmanned machine including the physical signal component 202 can maintain a predetermined position (e.g., above, below, lateral, ahead, and/or behind) and/or a predetermined distance from at least one other unmanned machine. The at least one generated physical signal can include at least one of audio, visual, infrared, and/or chemical signal, etc. which can be detected by unmanned machines in the vicinity. The generated visual signal can include at least one of polarized light, QR codes, animations, symbols (e.g., morse code), text, images, etc., and/or combinations thereof. The generated audio signal can include various sounds which can be inside and/or outside the human audible spectrum, such as at least a portion of song, melody, ping, speech, noise, spoken implementation instructions, etc., and/or combinations thereof. The at least one physical signal can be generated by the physical signal component 202 on a time-internal basis that might only take one round trip delay of light (in an optimal case) between the unmanned machine including the physical signal component 202 and at least one other unmanned machine including the robotic sensing component 204 (described below). The implementation instructions, the generated at least one physical signal, and/or the use of error correction codes can be encrypted (e.g., public-key cryptography).

For example, a user selects a predetermined formation for displaying a multi-screen streaming video using the unmanned machine synchronization using robotic sensing program 150. A coordinator unmanned machine connected to a physical signal component 202 displays a physical signal in the form of a wraparound symbolic sentence in the vicinity of various other unmanned machines which is unintelligible without unique decryption by an unmanned machine including the robotic sensing component 204.

The robotic sensing component 204 can receive the at least one generated physical signal, analyse physical signal attributes, and extract corresponding implementation instructions to perform at least one task. The robotic sensing component 204 can be included in at least one unmanned machine (e.g., a coordinator unmanned machine and/or an unmanned machine also involved in performing the at least one task) and/or can be connected thereto via the network. The robotic sensing component 204 can be equipped with various robotic sensing capabilities and/or physical signal measuring devices. The extracted implementation instructions corresponding to a same physical signal can vary depending on the analyzed physical signal attributes relative to an unmanned machine, such as a corresponding magnitude, intensity, timing, and/or at least one of relative orientation, position, distance, clarity, and/or angle. Combinations of different physical signals, durations, and/or timings thereof can correspond to the same or different extracted implementation instructions. In an embodiment of the present inventive concept, a plurality of unmanned machines connected to the robotic sensing component 204 can be provided, at least some of which can receive extracted implementation instructions related to performing a coordinated task (e.g., synchronization). The extracted implementation instructions for the coordinated task can include implementation instructions for at least two different subtasks (e.g., roles, positions, actions, etc.). The robotic sensing component 204 can cooperate with the physical signal component 202 to cascade, repeat, exhibit predetermined cue behaviors, relay, and/or otherwise transmit extracted implementation instructions and/or physical signals to adjacent unmanned machines (e.g., unmanned machines which are unresponsive, outside robotic sensing/physical signal measurement range, and/or are encountering a detected physical obstruction, etc.) via a recipient unmanned machine or a coordinator unmanned machine. In an embodiment of the present inventive concept, the robotic sensing component 204 can take an inventory of expected recipient unmanned machines. The robotic sensing component 204 can use machine learning (e.g., computer vision) to determine whether at least one physical obstacle (e.g., trees, ambient noise, visual noise, etc.) is interfering with receipt of the at least one physical signal and act accordingly (e.g., move the intended recipient unmanned machine, the coordinator unmanned machine, and/or an adjacent recipient device).

For example, the robotic sensing component 204 connected to the various other unmanned machines in the vicinity of the coordinator unmanned machine receives the wraparound symbolic sentence from different vantages and with different light intensities. The robotic sensing component 204 connected to the various other unmanned machines extracts implementation instructions based on respective vantages and corresponding light intensities. However, one unmanned machine is outside of robotic sensing distance of the wraparound symbolic sentence and another unmanned machine is within a robotic sensing distance, but trees are determined to obstruct its field of view. The robotic sensing component 204 deploys an adjacent recipient unmanned machine to physically relay the signal.

The implementation component 206 can perform the at least one task (e.g., surveying, hazard mitigation, alert dissemination, etc.) associated with the extracted implementation instructions by mobilizing at least one unmanned machine to take at least one action. The implementation component 206 can be included in at least one unmanned machine (e.g., a coordinator unmanned machine and/or an unmanned machine also involved in performing the at least one task) and/or can be connected thereto via the network. The actions can include movement, angulation, repositioning, etc. of at least one unmanned machine. The implementation component 206 can synchronize unmanned machine actions to assemble in a formation, engage in a concerted action, and/or assume roles/sub-tasks, etc. The implementation component 206 can determine and coordinate performance of actions, which can include implementing relative positions, timings and/or durations of actions. The implementation component 206 can calculate adjustments to the extracted implementation instructions associated with actions and/or an overall task based upon environmental conditions, relative capabilities of unmanned machines in the vicinity, efficiency of performance, modified task directives, etc. and can cooperate with the physical signal component 202 to generate new physical signals accordingly. The implementation component 206 can perform the at least one task automatically upon extracting the implementation instructions unless a predetermined environmental condition is detected and/or a user initiates an override. In an embodiment of the present inventive concept, the implementation component 206 can determine if the at least one task, constituent actions, and/or a synchronization is properly implemented. If an unmanned machine fails to take proper actions associated with corresponding extracted implementation instructions, the implementation component 206 can cause the physical signal component 202 to repeat a corresponding physical signal, such as by use of an adjacent unmanned machine (e.g., a nearest unmanned machine, the coordinator unmanned machine, an idle unmanned machine, etc.). In addition, the implementation component 206 can determine if a physical obstacle is interfering with the performed tasks, synchronization, and/or individual actions and act accordingly (e.g., cooperate with the physical signal component 202 to generate new physical signals and/or autonomously alter actions of unmanned machines).

For example, the various other unmanned machines automatically perform actions associated with their respective extracted implementation instructions via the implementation component 206. The various other unmanned machines assume respective relative locations to display a coherent streaming video across multiple screens. However, one unmanned machine fails to properly position in the formation. The implementation component 206 detects the discrepancy in the formation and the causative obstructing tree. The implementation component 206 moves the entire unmanned machine formation forward a few feet to ameliorate the obstruction of the tree.

Figure 3:
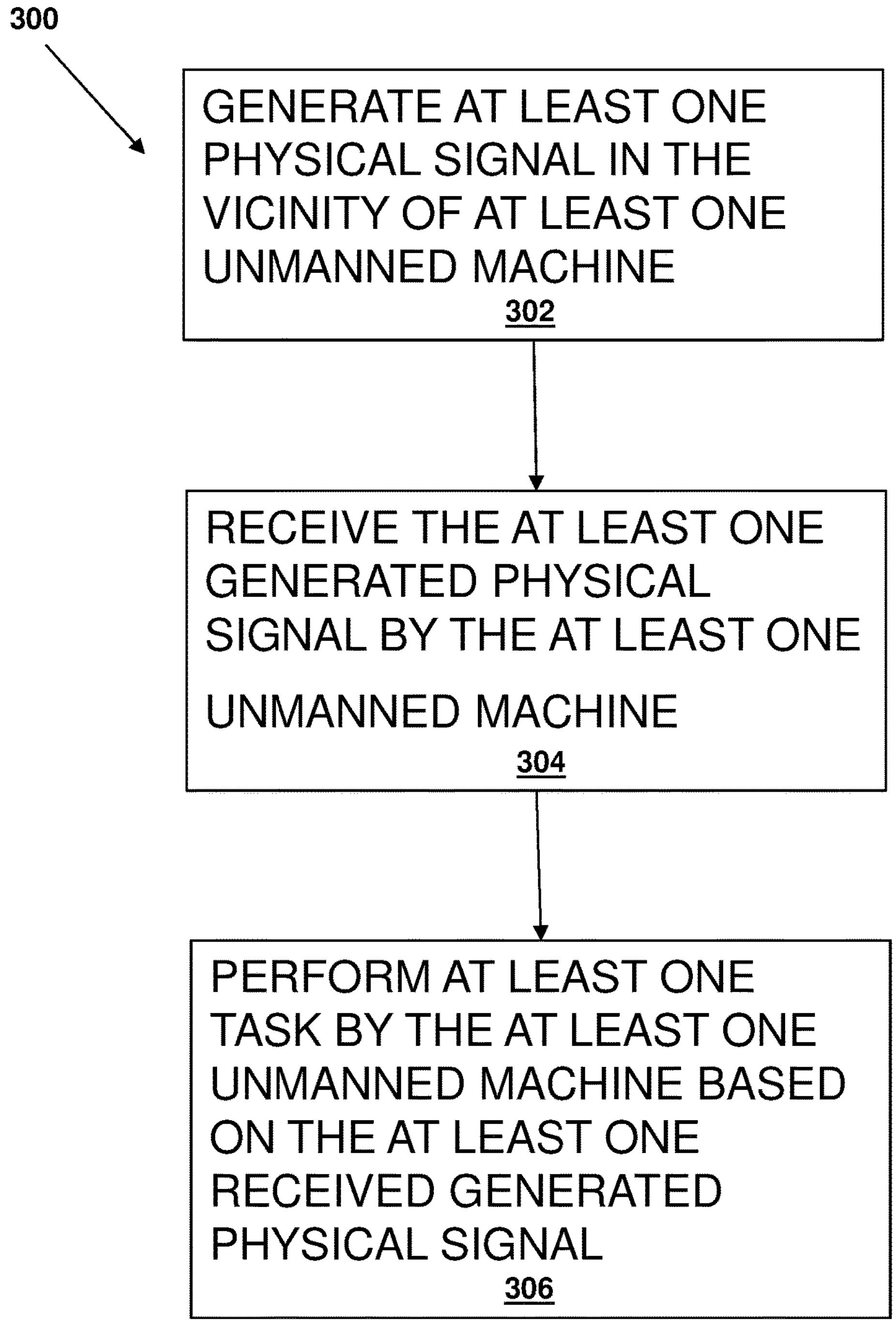
FIG. 3 illustrates a flowchart of a method of unmanned machine synchronization using robotic sensing 300, in accordance with an exemplary embodiment of the present inventive concept.

FIG. 3 illustrates a flowchart of unmanned machine synchronization using robotic sensing 300, in accordance with an exemplary embodiment of the present inventive concept.

The physical signal component 202 can generate at least one physical signal in the vicinity of at least one unmanned machine (step 302).

The robotic sensing component 204 can receive the at least one generated physical signal by the at least one unmanned machine (step 304).

The implementation component 206 can perform at least one task by the at least one unmanned machine based on the at least one received generated physical signal (step 306).

Based on the foregoing, a computer system, method, and computer program product have been disclosed. However, numerous modifications, additions, and substitutions can be made without deviating from the scope of the exemplary embodiments of the present inventive concept. Therefore, the exemplary embodiments of the present inventive concept have been disclosed by way of example and not by limitation.

What is claimed is:

1. A method of unmanned machine synchronization using robotic sensing, the method comprising:

generating at least one physical signal in the vicinity of at least one unmanned machine, wherein the physical signal includes only a visual signal, audio signal and chemical signal;

receiving the at least one generated physical signal by the at least one unmanned machine; and performing at least one task by the at least one unmanned machine based on the at least one received generated physical signal.

2. The method of claim 1, wherein the at least one unmanned machine is a plurality of unmanned machines.

3. The method of claim 1, wherein the at least one unmanned machine is a UAV.

4. The method of claim 1, wherein the generated physical signal is a plurality of physical signals.

5. The method of claim 1, wherein the visual signal and the audio signal are generated by a display device and a speaker, respectively.

6. The method of claim 1, wherein the performed at least one task is based on a position of the at least one unmanned machine relative to the at least one received generated physical signal.

7. The method of claim 2, wherein the at least one performed task includes synchronizing the plurality of unmanned machines.

8. A computer program product for unmanned machine synchronization using robotic sensing comprising:

one or more computer-readable storage media and program instructions stored on the one or more non-transitory computer-readable storage media capable of performing a method, the method comprising:

generating at least one physical signal in the vicinity of at least one unmanned machine, wherein the physical signal includes only a visual signal, audio signal and chemical signal;

receiving the at least one generated physical signal by the at least one unmanned machine; and performing at least one task by the at least one unmanned machine based on the at least one received generated physical signal.

9. The computer program product of claim 8, wherein the at least one unmanned machine is a plurality of unmanned machines.

10. The computer program product of claim 8, wherein the at least one unmanned machine is a UAV.

11. The computer program product of claim 8, wherein the generated physical signal is a plurality of physical signals.

12. The computer program product of claim 8, wherein the visual signal and the audio signal are generated by a display device and a speaker, respectively.

13. The computer program product of claim 8, wherein the performed at least one task is based on a position of the at least one unmanned machine relative to the at least one received generated physical signal.

14. The computer program product of claim 9, wherein the at least one performed task includes synchronizing the plurality of unmanned machines.

15. A computer system for unmanned machine synchronization using robotic sensing, the computer system comprising:

one or more computer processors, one or more computer-readable storage media, and program instructions stored on the one or more of the computer-readable storage media for execution by at least one of the one or more processors capable of performing a method, the method comprising:

generating at least one physical signal in the vicinity of at least one unmanned machine, wherein the physical signal includes only a visual signal, audio signal and chemical signal;

receiving the at least one generated physical signal by the at least one unmanned machine; and performing at least one task by the at least one unmanned machine based on the at least one received generated physical signal.

16. The computer system of claim 15, wherein the at least one unmanned machine is a plurality of unmanned machines.

17. The computer system of claim 15, wherein the at least one unmanned machine is a UAV.

18. The computer system of claim 15, wherein the generated physical signal is a plurality of physical signals.

19. The computer system of claim 15, wherein the visual signal and the audio signal are generated by a display device and a speaker, respectively.

20. The computer system of claim 15, wherein the performed at least one task is based on a position of the at least one unmanned machine relative to the at least one received generated physical signal.

* * * * *